(12) United States Patent
Smith et al.

(10) Patent No.: US 6,620,497 B2
(45) Date of Patent: Sep. 16, 2003

(54) POLYMER COMPOSITION WITH BORON NITRIDE COATED CARBON FLAKES

(75) Inventors: Lyle James Smith, Providence, RI (US); E. Mikhail Sagal, Watertown, MA (US); James D. Miller, Marietta, GA (US); Kevin McCullough, Warwick, RI (US)

(73) Assignee: Cool Options, Inc., Warwick, RI (US)

( * ) Notice: Subject to any disclaimer, the term of this patent is extended or adjusted under 35 U.S.C. 154(b) by 0 days.

(21) Appl. No.: 09/757,895

(22) Filed: Jan. 10, 2001

(65) Prior Publication Data

US 2001/0048172 A1 Dec. 6, 2001

Related U.S. Application Data

(60) Provisional application No. 60/175,436, filed on Jan. 11, 2000.

(51) Int. Cl.$^7$ ............. B32B 18/00; B32B 25/02; B32B 27/20; B32B 27/36
(52) U.S. Cl. ............. 428/323; 428/325; 428/357; 428/402; 428/403; 428/404
(58) Field of Search ............. 428/323, 325, 428/403, 404, 357

(56) References Cited

U.S. PATENT DOCUMENTS

| | | | |
|---|---|---|---|
| 3,398,233 A | 8/1968 | Lizasoain et al. | 174/110 |
| 3,673,121 A | 6/1972 | Meyer | 252/511 |
| T904,012 I4 | 11/1972 | Staniland | 252/503 |
| 3,708,387 A | 1/1973 | Turner et al. | 161/168 |
| 4,098,945 A | 7/1978 | Oehmke | 428/327 |
| 4,307,147 A | 12/1981 | Ohishi et al. | 428/268 |
| 4,367,745 A | 1/1983 | Welage | 128/303.13 |
| 4,496,475 A | 1/1985 | Abrams | 252/514 |
| 4,568,592 A | 2/1986 | Kawaguchi et al. | 428/107 |
| 4,664,971 A | 5/1987 | Soens | 428/288 |
| 4,689,250 A | 8/1987 | Quella et al. | 427/216 |
| 4,816,184 A | 3/1989 | Fukuda et al. | 252/511 |
| 5,011,870 A | 4/1991 | Peterson | 523/220 |
| 5,011,872 A | 4/1991 | Latham et al. | 523/440 |
| 5,021,494 A | 6/1991 | Toya | 524/404 |
| 5,098,610 A | 3/1992 | Okamura et al. | 252/511 |
| 5,098,611 A | 3/1992 | Honda et al. | 252/518 |
| 5,106,540 A | 4/1992 | Barma et al. | 252/511 |
| 5,180,513 A | 1/1993 | Durand | 252/62.55 |
| 5,183,594 A | 2/1993 | Yoshinaka et al. | 252/518 |
| 5,213,715 A | 5/1993 | Patterson et al. | 252/518 |
| 5,225,110 A | 7/1993 | Kathirgamanathan | 252/512 |
| 5,286,416 A | 2/1994 | Teichmann et al. | 252/512 |
| 5,302,456 A | 4/1994 | Matsui | 428/407 |
| 5,334,330 A | 8/1994 | Rowlette | 252/512 |
| 5,373,046 A | 12/1994 | Okamura et al. | 524/496 |
| 5,397,608 A | 3/1995 | Soens | 428/34.5 |
| 5,445,308 A | 8/1995 | Nelson et al. | 228/121 |
| 5,490,319 A | 2/1996 | Nakamura et al. | 29/596 |
| 5,522,962 A | 6/1996 | Koskenmaki et al. | 156/272.4 |
| 5,536,568 A | 7/1996 | Teruo | 428/327 |
| 5,580,493 A | 12/1996 | Chu et al. | 252/511 |
| 5,669,381 A | 9/1997 | Hyatt | 428/402 |
| 5,681,883 A | 10/1997 | Hill et al. | 524/404 |
| 5,770,305 A | 6/1998 | Terasaka | 428/328 |
| 5,834,337 A | 11/1998 | Unger et al. | 438/122 |
| 5,851,644 A | 12/1998 | McArdle et al. | 428/213 |
| 5,863,467 A | 1/1999 | Mariner et al. | 252/511 |
| 5,945,217 A | 8/1999 | Hanrahan | 428/403 |
| 6,048,919 A | 4/2000 | McCullough | 524/404 |
| 6,194,067 B1 * | 2/2001 | Hamada et al. | 428/367 |

FOREIGN PATENT DOCUMENTS

EP    WO99/00325    *    7/1999

* cited by examiner

*Primary Examiner*—Paul Thibodeau
*Assistant Examiner*—Nikolas J. Uhlir
(74) *Attorney, Agent, or Firm*—Barlow, Josephs & Holmes, Ltd.

(57) ABSTRACT

A thermally conductive and electrically insulative polymer composition and a method for creating the same is provided. Thermally conductive filler material is coated with a thermally conductive and electrically insulative coating material and mixed with a base polymer matrix. The mixture is molded into the desired shape. The electrically insulative coating material prevents the transfer of electricity through the filler material thus resulting in an electrically insulative composition.

2 Claims, No Drawings

POLYMER COMPOSITION WITH BORON NITRIDE COATED CARBON FLAKES

This application claims the benefit of Provisional Application No. 60/175,436, filed Jan. 11, 2000.

BACKGROUND OF THE INVENTION

The present invention relates generally to an improved method of manufacturing a composite material. More specifically, the present invention relates to a method of manufacturing a molded material, formed from a base matrix loaded with filler material, that results in a completed composition that has high thermally conductivity and low electrical conductivity.

In the heat sink industries, it has been well known to employ metallic materials for thermal conductivity applications, such as heat dissipation for cooling semiconductor device packages. For these applications, such as heat sinks, the metallic material typically is tooled or machined from bulk metals into the desired configuration. However, such metallic conductive articles are typically very heavy, costly to machine and are susceptible to corrosion. Further, the geometries of machined metallic heat dissipating articles are very limited to the inherent limitations associated with the machining or tooling process. As a result, the requirement of use of metallic materials which are machined into the desired form, place severe limitations on heat sink design particular when it is known that certain geometries, simply by virtue of their design, would realize better efficiency but are not attainable due to the limitations in machining metallic articles.

It is widely known in the prior art that improving the overall geometry of a heat dissipating article can greatly enhance the overall performance of the article even if the material is the same. Therefore, the need for improved heat sink geometries necessitated an alternative to the machining of bulk metallic materials. To meet this need, attempts have been made in the prior art to provide molded compositions that include conductive filler material therein to provide the necessary thermal conductivity. The ability to mold a conductive composite enabled the design of more complex part geometries to realize improved performance of the part.

The attempts in the prior art included the employment of a polymer base matrix loaded with a granular material, such as boron nitride grains. Also, attempts have been made to provide a polymer base matrix loaded with flake-like filler material. These attempts are, indeed, moldable into complex geometries but still do not approach the desired performance levels found in metallic machined parts. In addition, known conductive plastic materials are undesirable because they are typically very expensive to manufacture because they employ very expensive filler materials. Still further, these conductive composite materials must be molded with extreme precision due to concerns of filler alignment during the molding process. Even with precision molding and design, inherent problems of fluid turbulence and collisions with the mold due to complex product geometries make it impossible to position the filler ideally thus causing the composition to perform far less than desirable.

Moreover, the entire matrix of the composition must be satisfactory because heat transfer is a bulk property rather than a direct path property such as the transfer of electricity. A direct path is needed to conduct electricity. However, heat is transferred in bulk where the entire volume of the body is employed for the transfer. Therefore, even if a highly conductive narrow conduit is provided through a much lower conductive body, the heat transfer would not be as good as a body which is consistently marginally conductive throughout the entire body. Therefore, consistency of the thermal conductivity of the entire matrix of the composite body is essential for overall high thermal conductivity.

The fillers used in the prior art to create and enhance the thermally conductive properties of polymer composition also have inherently electrically conductive properties. In general these fillers include aluminum, magnesium or carbon flakes or carbon fibers. By incorporating these fillers into a polymer composition at the generally high ratio required to produce thermal conductivity (as is well known in the prior art), these fillers also impart their inherently electrically conductive properties to the composition. The filler materials used are generally metallic or carbon based and conduct electricity along the same pathways that the heat is conducted. Further, attempting to insulate the composition to prevent electrical conductivity would also interrupt the thermally conductive pathways and defeat the ability of the composition to transfer heat. This electrically conductive property, however, is often undesirable when the thermally conductive polymer is used in electronics applications where transfer of static electrical charges could interfere with the operation of the device or destroy the electronic components therein.

In addition, use of thermally conductive polymer compositions may be indicated in high voltage applications where both the electrically insulative properties of polymer compositions and thermally conductive properties of filled polymer compositions are desirable. For example, use of a lightweight thermally conductive polymer material would be desirable for construction of the outer case for the transformer within a computer power source as an effective solution for dissipating the heat generated during the transformer operation, however, the case must also provide electrical insulation to prevent the transfer of high voltage. In the present state of the art, a technology that provides both thermally conductive and electrically insulative properties is not available.

In view of the foregoing, there is a demand for a composite material that is highly thermally conductive yet electrically insulative. In addition, there is a demand for a composite material that can be molded or cast into complex product geometries. There is also a demand for such a moldable article that exhibits thermal conductivity as close as possible to purely metallic conductive materials while being an effective insulator against transmission of electricity.

SUMMARY OF THE INVENTION

The present invention preserves the advantages of prior art thermally conductive plastic compositions namely netshape moldability and thermal conductivity. In addition, it provides new advantages of electrically insulative properties not found in currently available compositions and overcomes many disadvantages of such currently available compositions.

The invention is generally directed to the novel and unique thermally conductive plastic composite material with electrically insulative properties having particular application in heat dissipation applications where heat must be moved from one region to another to avoid device failure. The composite material of the present invention enables a highly thermally conductive composite material to be manufactured at relatively low cost. The conductive molding composition of the present invention preserves a thermal conductivity above 22 W/m°K while also providing insulation against electrical conductivity. The thermally conductive composition includes a polymer base matrix of, by volume, between 30 and 60 percent and thermally conductive filler materials, by volume, between 35 and 70 percent.

Prior to mixing the filler material into the polymer base matrix in preparation for injection molding, the filler material is coated with another, thermally conductive and electrically insulative material. The coating material, while highly thermally conductive does not allow electrical conductivity across its surface. As a result, the coating material effectively electrically insulates the filler material and prevents it from conducting electricity throughout the composition while allowing still allowing heat to be transferred through its surface and into the filler. After the coating process, the coated filler is incorporated into the polymer base matrix material and injection molded. Therefore, the present invention preserves the benefits of the thermal conductivity in the prior art, while overcoming the shortfall by insulating against electrical conductivity.

It can be appreciated that the present application has a broad range of applications in areas where use of lightweight material is indicated that can transfer the heat out of an object while preventing the flow of electricity. By way of example, a transformer in a computer power supply is an application that in its operation generates a great deal of heat but must also be insulated to prevent the outflow of voltage. In traditional applications the transformer coils and windings are insulated and supported within a plastic housing with vent holes to allow airflow and passive heat dissipation. Using the present invention the insulation and isolation layers would not be required, as the entire housing would be electrically insulated by the coating material on the conductive filler within the composition. The heat that is generated by the transformer's operation, however, would be conducted directly through the heat transfer pathways in the thermally conductive filler to the outer surface of the housing and dissipated.

It is therefore an object of the present invention to provide a conductive composite material that has a greater thermal conductivity and lower electrical conductivity than found in prior art composites.

It is an object of the present invention to provide a thermally conductive composite material that does not conduct electricity and is moldable.

It is a further object of the present invention to provide a low cost thermally conductive and electrically insulative composite material.

Another object of the present invention is to provide a thermally conductive composite material that does not conduct electricity and enables the molding of complex part geometries.

It is a further object of the present invention to provide a thermally conductive composite material that does not conduct electricity and is significantly lighter in weight than metallic materials.

It is yet a further object of the present invention to provide a conductive composite material that has a thermal conductivity close to pure metallic materials and does not conduct electricity.

DETAILED DESCRIPTION OF THE PREFERED EMBODIMENT

The present invention is composition and a method by which a composition, formed by combining a polymer base matrix, a thermally and electrically conductive filler, carrying a thermally conductive and electrically insulative coating material, preferably boron nitride, is molded into a finished component that has thermally conductive and electrically insulative properties.

The composition of the present invention employs a base matrix of polymer, for example, with different types of filler material loaded therein. The base matrix is, preferably, liquid crystal polymer; however, it may be other materials. This composition is achieved through the steps of combining the base matrix material with a thermally conductive filler material and molding the composition. This process is known to result in producing polymer compositions with high thermal conductivities as compared to the base matrix alone.

The base matrix is loaded with thermally conductive filler. The mixture may include, as an example, by volume, 40 percent base matrix and 60 percent filler material. Depending on the base matrix and filler, loading can be even higher.

One of the primary reasons for employing a thermally conductive plastic composition is that it is net-shape moldable into more complex geometries to achieve better heat dissipation. Because of the versatility of the material, applications that would clearly indicate its use are extremely widespread. Many of these applications, however, require both heat dissipating and electrical insulation to be provided concurrently. By way of example, an electrical transformer as employed in a computer power supply converts high voltage alternating current power to low voltage direct current power for use within an electronic device. To protect the surrounding device components and the ultimate user of the device from electrical shock and voltage bleed from the operating transformer, the operational section of the transformer must be enclosed in an electrically insulative case. Traditionally, these cases would be constructed from a polymer material with insulative properties that not only prevent voltage transfer but also heat transfer. Since a great deal of heat is generated during the operation of the transformer device, and the traditional casings did not allow heat transfer, the solution in the prior art was to provide openings in the case to allow airflow and therefore heat transfer.

In these applications, it is logical to attempt to employ thermally conductive polymers as a heat transfer solution. The drawback in the prior art is that although the polymers conduct heat, they also conduct electricity over the same pathways used to transfer the heat. The present invention overcomes the electrical conductivity of the prior art allowing application of thermally conductive polymers in environments that also require electrical insulation.

The present invention provides a thermally conductive composite material that is formed by first coating the thermally conductive filler material that is to be employed. The coating of the thermally conductive filler material provides a barrier against the natural properties of the filler to conduct electricity while conducting heat to the filler, allowing the heat transfer process to continue. The preferred embodiment of the present invention employs carbon flakes as a thermally conductive filler material. The carbon flakes are then coated with a thermally conductive yet electrically insulative material, in the preferred embodiment this coating is boron nitride. The coating provides electrical insulation to the naturally conductive filler material preventing transfer of electricity into the filler core and thus preventing electrical conductivity throughout the final composition.

Once coated, the filler material is introduced to the base polymer matrix. The two components are mixed and loaded into the desired molding machine and associated mold using molding techniques known in the art. Once removed from the mold, the final composition is in its final net shape and ready for its end use.

As can be understood, the process does not eliminate the localized, introduction of electrical current into the composition or slight conductivity in localized areas within the material. The composition formed in the process of the present invention, however, prevents conduction of electricity throughout the entire composition by interrupting the pathways within the composition over which the electricity would flow.

The process of the present invention can be employed for many of the various configurations used in fabricating a thermally conductive composite. Although the preferred embodiment indicates the use of carbon flake filler in a polymer base matrix, many other fillers can be employed to achieve the desired thermally conductive composition. As the type of filler varies, the method of coating the particular material remains the same and boron nitride is employed as the coating material.

In view of the foregoing, a superior moldable thermally conductive composite material with electrically insulative properties can be realized. The composition of the present invention, greatly improves over prior art attempts to provide such electrically insulative, moldable, thermally conductive materials. In particular, the present invention provides thermal conductivity that is vastly improved over known compositions and provides insulation against the flow of electricity that was until now unavailable in the prior art.

It would be appreciated by those skilled in the art that various changes and modifications can be made to the illustrated embodiments without departing from the spirit of the present invention. All such modifications and changes are intended to be covered by the appended claims.

What is claimed is:

1. A thermally conductive, non-electrically conductive molding composition having a thermal conductivity of at least 22W/m° K, comprising:

a liquid crystal polymer base matrix;

a thermally conductive, electrically conductive carbon flake filler loaded in said polymer base matrix; and a layer of thermally conductive and non-electrically conductive boron nitride coated on said thermally conductive filler, said coating encapsulating said carbon flake filler to provide a layer of electrical insulation around said filler.

2. A method of molding an electrically non-conductive, thermally conductive composition, having a thermal conductivity of at least 22W/m° K comprising the steps of:

providing a liquid crystal polymer bass matrix material;

providing a thermally conductive, electrically conductive carbon flake filler material;

coating said filler material with boron nitride, said coating encapsulating said carbon flake filler to provide a layer of electrical insulation around said filler;

mixing said filler material with said base matrix into a mixture; and molding said mixture into a net-shape molded article, wherein said article is thermally conductive and electrically non-conductive.

* * * * *